(12) United States Patent
Djordjevic et al.

(10) Patent No.: US 10,162,121 B2
(45) Date of Patent: Dec. 25, 2018

(54) RECONFIGURABLE OPTICAL SPACE SWITCH

(71) Applicant: NEC Laboratories America, Inc., Princeton, NJ (US)

(72) Inventors: Ivan B. Djordjevic, Tuscon, AZ (US); Shaoliang Zhang, Princeton, NJ (US); Ting Wang, West Windsor, NJ (US)

(73) Assignee: NEC Corporation (JP)

(*) Notice: Subject to any disclaimer, the term of this patent is extended or adjusted under 35 U.S.C. 154(b) by 0 days.

(21) Appl. No.: 15/907,777

(22) Filed: Feb. 28, 2018

(65) Prior Publication Data
US 2018/0252870 A1 Sep. 6, 2018

Related U.S. Application Data

(60) Provisional application No. 62/466,505, filed on Mar. 3, 2017.

(51) Int. Cl.
*G02B 6/35* (2006.01)

(52) U.S. Cl.
CPC .......... *G02B 6/3512* (2013.01); *G02B 6/356* (2013.01); *G02B 6/3546* (2013.01); *G02B 6/3584* (2013.01)

(58) Field of Classification Search
CPC .................................................. G02B 6/3546
See application file for complete search history.

(56) References Cited

U.S. PATENT DOCUMENTS

| | | | | | |
|---|---|---|---|---|---|
| 5,367,584 | A | * | 11/1994 | Ghezzo ................ | G02B 6/1221 385/17 |
| 6,587,626 | B2 | * | 7/2003 | Beguin .................. | G02B 6/122 385/125 |
| 2005/0002597 | A1 | * | 1/2005 | Penty ..................... | G02F 1/3133 385/14 |

OTHER PUBLICATIONS

Urquhart, "Optical Fiber Bus Protection Network to Multiplex Sensors: Self-Diagnostic Operation", Journal of Light Wave Technology, vol. 29, No. 10, May 2011, pp. 1427-1436.

Udd, "Overview Fiber Optic Sensors," 4Fiber Optic Sensors, Yin, S., Ruffin, P.B., Yu, F.T.S., Eds.; Taylor & Francis: New York, NY, USA, Apr. 1995, 17 pages.

Fernandez-Vallejo, "Optical Fiber Networks for Remote Fiber Optic Sensors," Sensors, vol. 12, Mar. 2012, pp. 3929-3951.

Leandro, "Random DFB Fiber Laser for Remote (200 km) Sensor Monitoring Using Hybrid WDM/TDM," J. Lightwave Technol., vol. 34, Issue 19, Mar. 2016, pp. 4430-4436.

(Continued)

*Primary Examiner* — Omar R Rojas
(74) *Attorney, Agent, or Firm* — Joseph Kolodka

(57) ABSTRACT

A method and switch are provided for reconfigurable optical space switch. The method includes receiving a control signal, from a controller, to configure a path through the reconfigurable optical space switch. The method also includes applying a voltage to one or more direction changing devices at each intersection between each of the east-west optical waveguides and each of the north-south optical waveguides to form the path through the reconfigurable optical space switch. The method additionally includes receiving an optical signal in one of a plurality of passive waveguides at a beginning of the path, including the plurality of east-west optical waveguides and the plurality of north-south optical waveguides. The method further includes outputting the optical signal out on of the plurality of passive waveguides at an end of the path.

19 Claims, 13 Drawing Sheets

(56) References Cited

OTHER PUBLICATIONS

Djordjevic, "Design of DPSS based fiber Bragg gratings and their application in all-optical encryption, OCDMA, optical steganography, and orthogonal-division multiplexing," Optics Express, vol. 22, No. 9, May 2014, pp. 10882-10897.

Djordjevic, "Multidimensional Optical Transport Based on Optimized Vector-Quantization-Inspired Signal Constellation Design," IEEE Transactions on Communications, vol. 62, No. 9, Sep. 2014, pp. 3262-3273.

\* cited by examiner

1100

Configure, by a controller, the reconfigurable optical sensor network, including one or more reconfigurable optical space switches, for a type of sensor data.
1110

Generate sensor data in the type of sensor data with one or more of a plurality of bidirectional sensors.
1120

Send the sensor data to one or more optical star couplers.
1130

Forward the sensor data from one of the one or more optical star couplers to the one of one or more reconfigurable optical space switches.
1140

Receive a control signal, from a controller, to configure a path through the reconfigurable optical space switch.
1210

Apply a voltage to one or more direction changing devices at each intersection between each of the east-west optical waveguides and each of the north-south optical waveguides to form the path through the reconfigurable optical space switch.
1220

Receive an optical signal in one of a plurality of passive waveguides at a beginning of the path, including the plurality of east-west optical waveguides and the plurality of north-south optical waveguides.
1230

Output the optical signal out on of the plurality of passive waveguides at an end of the path.
1240

Receive sensor data to be transmitted on an optical network.
1310

↓

Encode the sensor data into an optical signal employing one or more multiplexing systems.
1320

↓

Transmit the optical signal over the optical network.
1330

↓

Decode the optical signal into the sensor data employing the one or more multiplexing systems.
1340

↓

Control an operation of a processor-based machine responsive to the sensor data.
1350

FIG. 13

RECONFIGURABLE OPTICAL SPACE SWITCH

RELATED APPLICATION INFORMATION

This application claims priority to 62/466,505, filed on Mar. 3, 2017, incorporated herein by reference herein its entirety. This application is related to an application entitled "Optically-Secured Adaptive Software-Defined Optical Sensor Network Architecture", and which is incorporated by reference herein in its entirety. This application is related to an application entitled "Transmitter/Receiver with Orbital Angular Momentum Based Optical Encryption", and which is incorporated by reference herein in its entirety.

BACKGROUND

Technical Field

The present invention relates to optical switches and more particularly to reconfigurable optical space switches.

Description of the Related Art

Distributed sensor networks have revolutionized sensing with numerous applications. However, the existing sensor networks, including optical switches, are costly and it is impossible to build separate sensor networks for different applications including environment monitoring, structural damages, tsunami effects, disaster handling and management, security issues, etc. In disaster situations, a wide range of information is obtained from many sensors and that information is employed to re-route traffic, reconfigure sensor networks to provide in a timely manner the required information for first responders and decision makers and consequently fix the problem at hand.

SUMMARY

According to an aspect of the present principles, reconfigurable optical space switch is provided. The switch includes a plurality of passive waveguides to transmit optical signals, including a plurality of east (E)-west (W) optical waveguides and a plurality of north (N)-south (S) optical waveguides. The switch also includes one or more direction changing devices at each intersection between each of the east-west optical waveguides and each of the north-south optical waveguides configurable to alter a path of an optical signal along one or more of the plurality of passive waveguides.

According to another aspect of the present principles, a method is provided for a reconfigurable optical space switch. The method includes receiving a control signal, from a controller, to configure a path through the reconfigurable optical space switch. The method also includes applying a voltage to one or more direction changing devices at each intersection between each of the east-west optical waveguides and each of the north-south optical waveguides to form the path through the reconfigurable optical space switch. The method additionally includes receiving an optical signal in one of a plurality of passive waveguides at a beginning of the path, including the plurality of east-west optical waveguides and the plurality of north-south optical waveguides. The method further includes outputting the optical signal out on of the plurality of passive waveguides at an end of the path.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 11 shows a flow diagram illustrating a method for reconfiguring optical sensor networks, in accordance with the present principles;

FIG. 12 shows a flow diagram illustrating a method for reconfiguring optical space switches, in accordance with the present principles; and FIG. 13 shows a flow diagram illustrating a four-dimensional multiplexing method for optical networks, in accordance with the present principles.

DETAILED DESCRIPTION OF PREFERRED EMBODIMENTS

Figure 1:
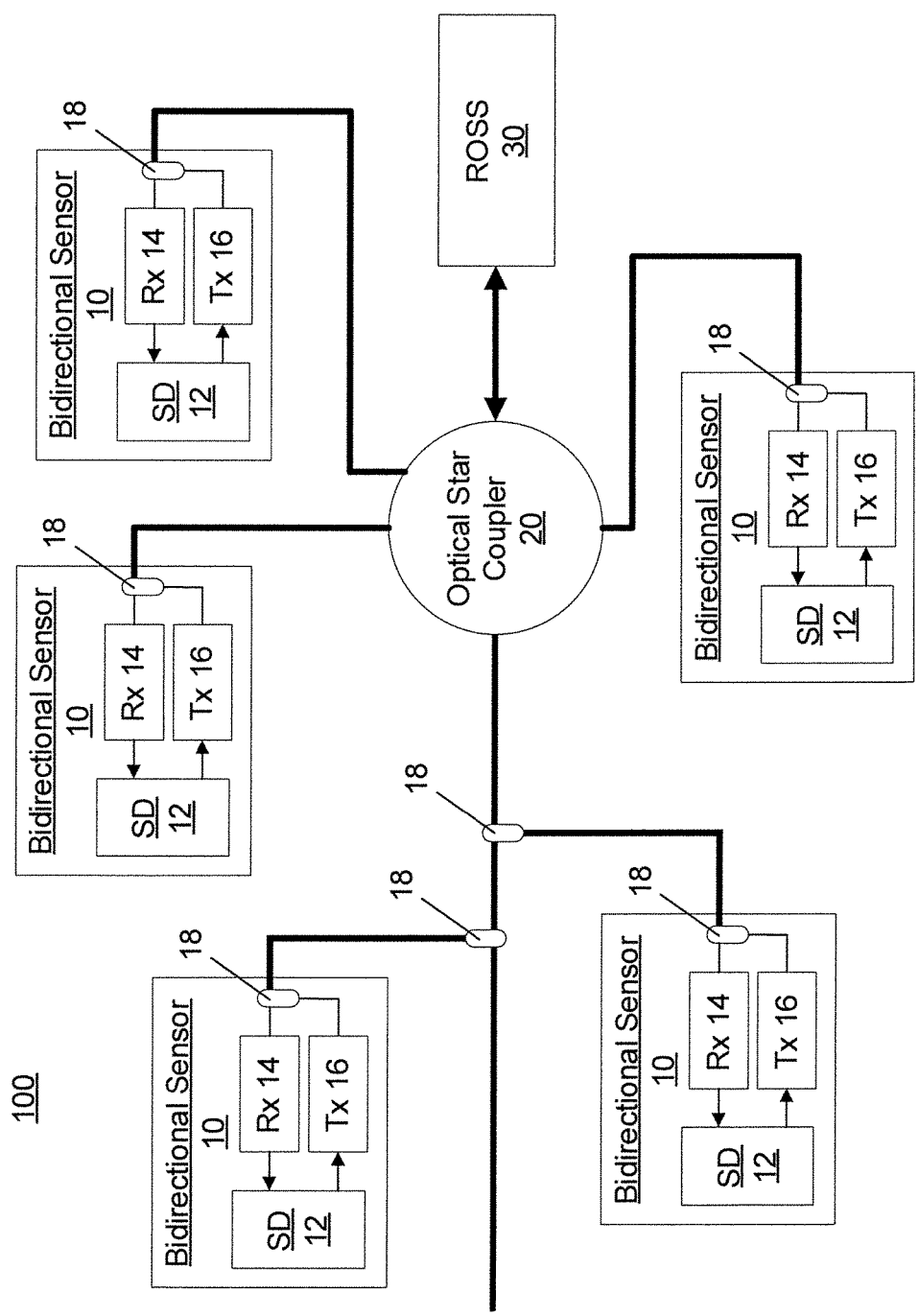
FIG. 1 shows a block diagram of software-defined optical sensor network, in accordance with the present principles.

In accordance with one embodiment, an adaptive software-defined optical sensor network (SDOSN) architecture capable of hosting programmable sensors ranging from several thousand to several million is provided. The sensing process is low cost, but highly accurate and capable of closely approaching the optical channel capacity. The SDOSN architecture is interoperable with existing optical networks infrastructure. Existing dark fibers can be used together with the currently used fiber infrastructure. Additionally, the DSOSN is programmable at runtime to change sensor network topology, active sensors, and their functions to accommodate current sensor network objectives and applications. The DSOSN is cost-effective and leverages the emerging virtual network technologies and software defined network paradigms.

In one embodiment, the nodes in SDOSN can be bidirectional sensor nodes composed of an optical transmitter, an optical receiver, and a sensor device integrated on the same chip. The SDOSN enables sensor networks to be adaptive to time-varying conditions and reconfigurable to specific objectives or applications. The SDOSN building modules/subsystems can include, e.g.: (i) microelectromechanical system-based (MEMS-based) reconfigurable optical space switch, which can be configured to operate as either unidirectional or bidirectional, capable of switching the wavelength band; (ii) hybrid optical sensor physical network organized in optical star topology with individual branches being optical fiber links operating as the optical buses; and (iii) unidirectional/bidirectional sensor nodes. To support high flexibility in terms of number of sensor nodes ranging from several thousand to several million, four-dimensional multiplexing is employed that includes time-, wavelength-, orbital angular momentum-, and optical basis functions-dimensions. Even with moderate requirements with respect to the number of discrete levels in each dimension, e.g., (>31), several million of sensor nodes can be supported. Fiber Bragg gratings (FBGs) with orthogonal impulse responses can be employed as optical basis functions. The class of Slepian sequences, which are mutually orthogonal regardless of the sequence order, can be employed to target mutually orthogonal FBG-impulse responses. These Slepian sequences based FBGs can be employed not only as an additional degree of freedom for orthogonal-division multiplexing, but also to provide all-optical encryption of high importance in the optically secured, adaptive SDOSN. Additionally, the orbital angular momentum (OAM) can be employed as an additional degree of freedom (DOF) with the purpose to, e.g.: (i) to secure sensor data and (ii) provide a new DOF, OAM multiplexing, to support a larger number of sensor nodes.

The impact of this approach will be to allow accurate, adaptive, run-time reconfigurable high-density optical sensor networks to be incorporated into existing state-of-the-art optical networks. This can result in a scalable, flexible and cost-effective sensor networks that can support millions of sensing nodes that can be programmed at runtime to accommodate a wide range of applications and objectives. The four-dimensional (4-D) approach scales well to an ultra-high density of sensors (even several millions), while employing moderate number of discrete levels per dimension, by using bidirectional sensor nodes that are low-cost, energy-efficient, bandwidth-efficient, and which require low maintenance; combined with the optical sensor network topology and reconfigurable photonic space switch. The SDOSN can provide all-optical encryption capability and thus the sensor readout information cannot be compromised by an unauthorized user. The secure sensor readout information can be employed to control an operation of a processor-based machine responsive to the sensor readout information, e.g., sounding an alarm, issuing a weather emergency alert, disabling power in a flooding situation, etc.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, a block diagram of software-defined optical sensor network 100 (SDOSN) is illustratively depicted in accordance with one embodiment of the present principles. In one embodiment, the SDOSN building modules/subsystems, as shown in FIG. 1, can include: (i) MEMS-based reconfigurable optical space switch 30 (ROSS), which can be configured to operate as either unidirectional or bidirectional, capable of switching the wavelength band; (ii) hybrid optical sensor physical network organized in optical star topology with individual branches with optical tap couplers 18 being optical fiber links operating as the optical buses and an optical star coupler 20; and (iii) unidirectional/bidirectional sensor nodes with configuration of bidirectional sensor node 10.

In one embodiment, the sensor node 10 can include a sensor device 12. The sensor device 12 can include more than one type of sensor, e.g., current sensors, voltage sensors, light sensors, seismic sensors, chemical sensors, smoke sensors, carbon monoxide sensors, air pollution sensors, electrochemical gas sensors, flow sensors, radiation sensors, pressure sensors, optical sensors, and temperature sensors. The sensor node 10 can include an optical transmitter 16 and an optical direct detection receiver 14 that are connected with an optical tap coupler 18. The optical transmitter 16 and the optical direct detection receiver 14 can communicate with the sensor device 12 in the sensor node 10.

To support high flexibility in terms of number of sensor nodes 10 ranging from several thousands to several millions, four-dimensional multiplexing can be employed including time-, wavelength-, OAM, and optical basis functions-dimensions. Even with moderate requirements with respect to the number of discrete levels in each dimension, e.g., (>31), several million sensor nodes can be supported. The FBGs with orthogonal impulse responses, can be employed as the optical basis functions, can be designed and fabricated. The class of Slepian sequences, which are mutually orthogonal regardless of the sequence order, can be employed as the target FBG-impulse responses. These Slepian sequences based FBGs will can be employed not only as an additional degree of freedom for orthogonal-division multiplexing, but also to provide all-optical encryption of high importance in the optically secured, adaptive SDOSN. Alternatively, complex-basis functions can be used as impulse responses of corresponding FBGs.

To enable the bidirectionality, in addition to bidirectional sensor node 10 shown in FIG. 1, a vertical-cavity surface-emitting laser (VCSEL)-based bidirectional sensor node can be employed. As with any kind of laser, VCSELs are usually considered as optical transmitters. However, VCSELs can operate also as optical receivers for high bandwidth amplitude modulated signals.

Figure 2:
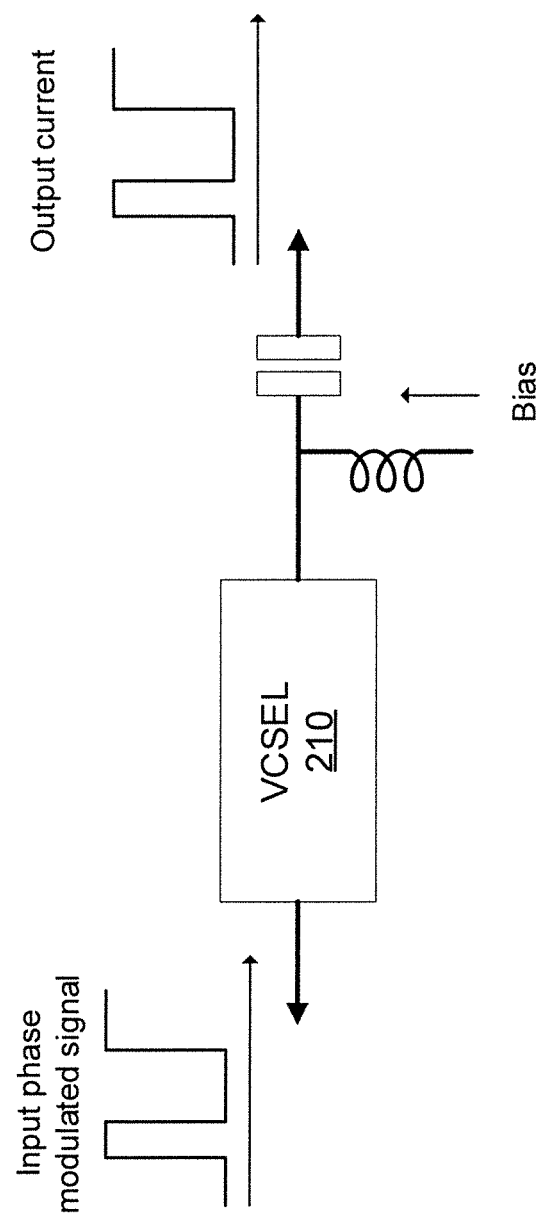
FIG. 2 shows a block diagram of vertical-cavity surface-emitting laser receiver, in accordance with the present principles.

Referring now to FIG. 2, a block diagram of vertical-cavity surface-emitting laser receiver is illustratively depicted in accordance with an embodiment of the present principles. A vertical-cavity surface-emitting laser receiver can be realized by injection-locking (IL) the VCSEL 210 to the receiving signal as illustrated in FIG. 2: once the IL is established, the modulation can be extracted directly by the VCSEL through its bias current. On the other end, operating in a low injection ratio regime, single-mode VCSELs can be employed to perform direct detection of the phase information carried by an optical signal. This approach is particularly useful for optical sensor network applications because it provides for high-linearity and multilevel transmission without the need of more complex coherent receivers. The mode of operation can be changed by changing the bias voltage polarity of the VCSEL. A solar cell-based battery supply for the VCSEL can be employed to extend the life-time of the VCSEL.

Figure 3:
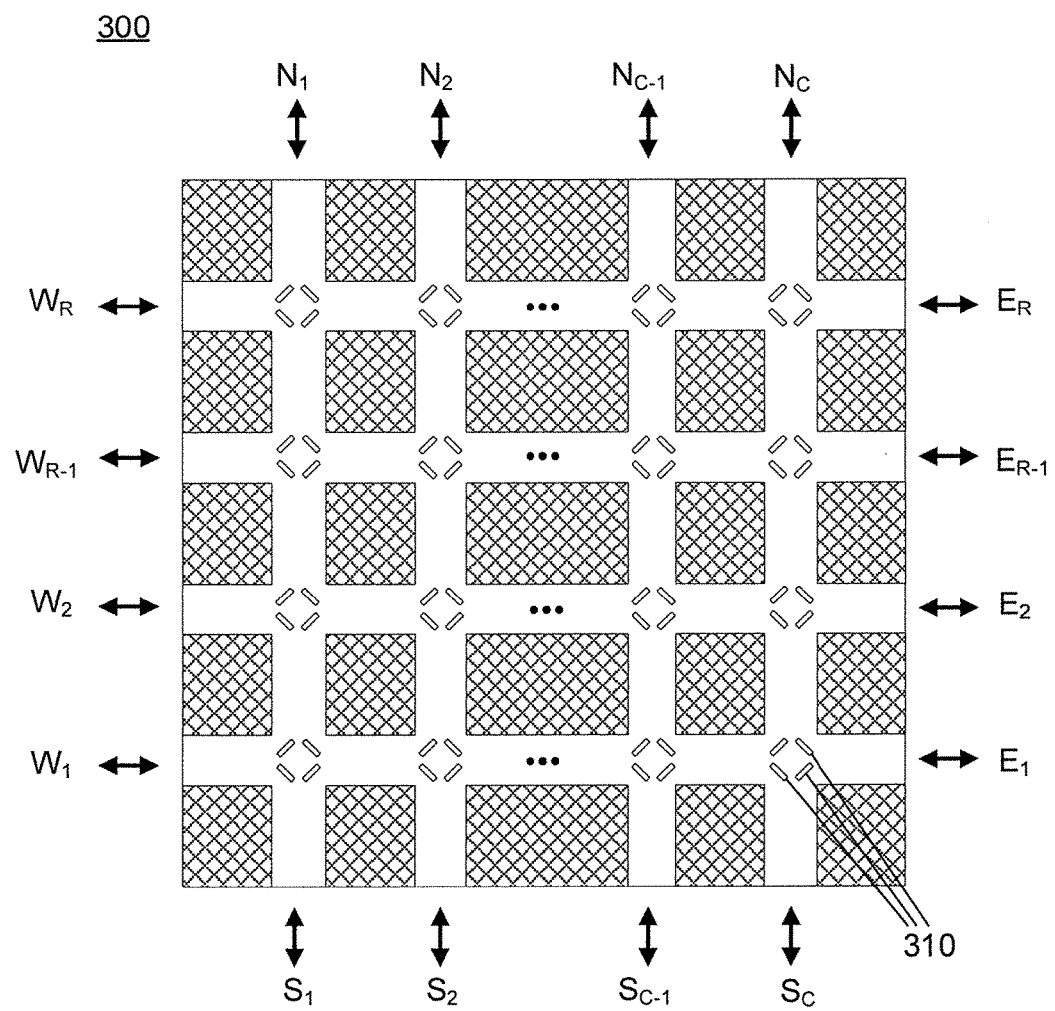
FIG. 3 shows a block diagram of reconfigurable optical space switch, in accordance with the present principles.

Referring now to FIG. 3, a block diagram of reconfigurable optical space switch 300 (ROSS) is illustratively depicted in accordance with an embodiment of the present principles. Consider the reconfiguration of the microelectromechanical system-mirrors-based active switch, illustrated in FIG. 3. To simplify the description of ROSS 300 reconfiguration, assume that the number of ports at each side of the switch is fixed to N. The ROSS architecture is based on an N×N grid, wherein there are 4N ports. Each port can serve either as an input or output. The grid consists of $N^2$ switching cells. The four sides of the switch and the four sides of a switching cell are referred to as North (N), East (E), South (S), and West (W). The state of a switching cell may be in any one of the three switching states: (1) NS-EW; (2) NE-SW; and (3) NW-SE; with traffic being bidirectional. The key differences of the ROSS architecture with respect to that of the crossbar switch can be summarized as follows. (i) A crossbar switch of size 4N×4N would utilize $16N^2$ switching cells, each with two states of operation. Alternately, the architecture utilizes only $N^2$ switching cells with three switching states per switching cell. (ii) A crossbar switch is non-blocking; however, the ROSS architecture is blocking.

To compensate for the blocking nature, the architecture provides the flexibility of realizing a given set of connections in many different ways. For full switching capability of the switching cell, two MEMS 310 are needed for E-N and E-S traffic, and two MEMS 310 for W-S and W-N traffic, as illustrated in FIG. 3. The switch can be operated also with only two highly-flexible MEMS-mirrors per switching cell, but will not be able to support full-duplex operation of the ROSS 300, which is typically not needed in optical sensor networks.

MEMS-mirrors based configuration time is in the order of several micro-seconds (µs). For certain, applications, the ROSS 300 should be operated in the order of several nano-seconds (ns). For these applications, the switch can be implemented by employing an active vertical coupler (AVC)-based ROSS as follows. The AVCs-based optical switch was initially fabricated in quaternary semiconductor multilayers deposited on an InP substrate. Some unique properties, include ultralow crosstalk, e.g., (67 dB), very high ON-OFF contrast ratio, e.g., (70 dB), about 1 nanosecond (ns) switching time, and lossless switching operation. The switching of optical signals exceeding 10 Gb/s has been demonstrated.

Figure 4:
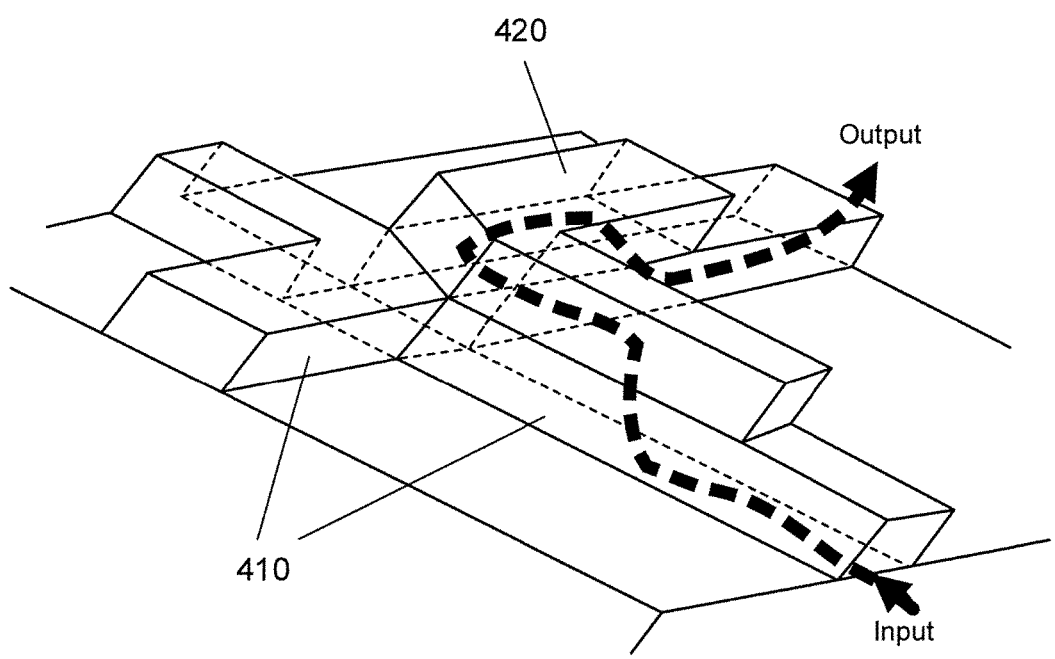
FIG. 4 shows a diagram of an active vertical coupler operation principle, in accordance with the present principles.

Referring now to FIG. 4, a diagram of an active vertical coupler operation principle 400 is illustratively depicted in accordance with an embodiment of the present principles. The switching cell of the switch, shown in FIG. 4, consists of two perpendicular groups of passive ridge waveguides 410 that form the input and output waveguides. Two Active Vertical Couplers (AVCs) 420 are formed at each cross-point by placing an active waveguide coupler stacked on top of both the input and output passive waveguides 410. A Total Internal Reflection (TIR) mirror cuts vertically through the active waveguide and diagonally across the waveguide intersection. This allows a 90° redirection of the optical signal from the first AVC 420 to the second one. In the ON state (in the presence of applied voltage), the applied voltage alters the refractive indices of AVC 420 and lower waveguides allowing the redirection of the light for 90°. The signal is reflected by the TIR, and then coupled from the upper waveguide to the output waveguide in the second AVC. A transient metal oxide material, whose index of refraction is latchable, can be employed for the AVC. In other words, once the applied voltage turns the AVC 420 on, the coupling structure remains stable without applying the voltage further. In the OFF state, the AVC 420 structure is erased by changing the polarity of the applied voltage. The effective refractive index of the upper waveguide is significantly different from that of the input and the output passive waveguides 410, resulting in very low coupling, and the input signal is forwarded to the next switching cell along the passive waveguide 410. A metal-oxide-metal structure, specifically, transition-metal-oxide materials sandwiched between noble metal electrodes, can be employed. A non-linear device named Memrister can be employed, the Memrister can include a nano-scale Pt—$TiO_2$—Pt structure, and exhibiting a non-linear current voltage response as well as a latching of resistivity by altering polarity of the applied voltage. A ROSS using this technology will only consume energy to change the switch state; once changed the ROSS will not consume energy to stay in that state. Alternatively, InGaAsP—InP technology, can also be employed.

Figure 5:
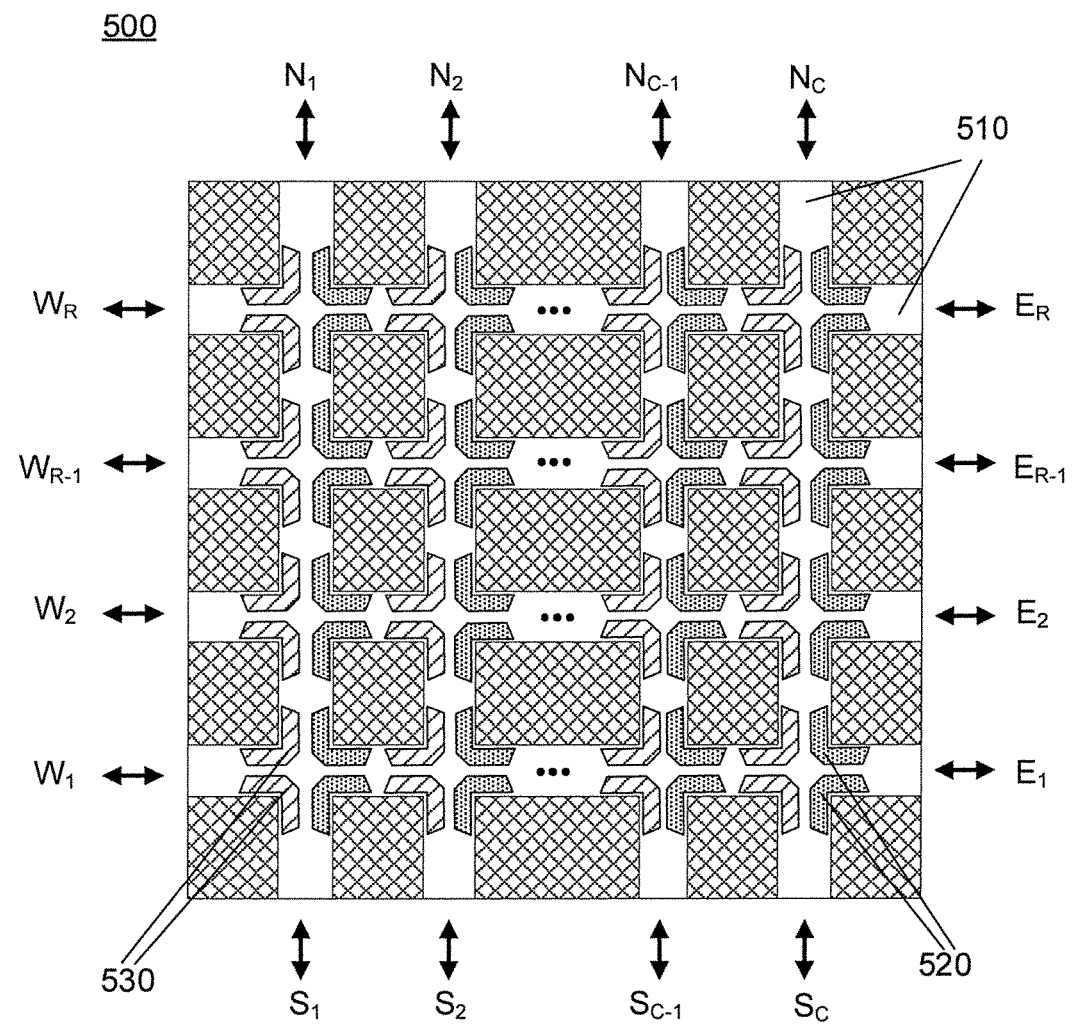
FIG. 5 shows a block diagram of active vertical coupler based reconfigurable optical space switch, in accordance with the present principles.

Referring now to FIG. 5, a block diagram of active vertical coupler based reconfigurable optical space switch 500 is illustratively depicted in accordance with an embodiment of the present principles. For full switching capability of the cell, two top and two bottom electrodes are needed, as illustrated in FIG. 5. The switching cells are further combined to form 2(c+r) ports ROSS, where c denotes number of switching cells per column, while r denotes the number of switching cells per row. The dashed-AVCS 530 are placed on the top of corresponding waveguide crosses, while the dotted-AVCs 520 on the bottom. The design has many features including: (i) the switch is bidirectional with the opposite direction data streams using different wavelengths; (ii) the switch has 2(c+r) ports; (iii) the switch allows full connectivity; (iv) the switching operation is latchable. While designing an ROSS matrix, the transmission characteristics can be optimized over the entire ROSS so that the quality of signals transmitted via the shortest and longest paths in the matrix are comparable. The wavelength paths (optical links) in the switch are bidirectional. The ROSS can employ 2W wavelengths $\{\lambda_1, \underline{\lambda}_1, \ldots, \lambda_w, \underline{\lambda}_w\}$, where $\lambda_i$ (i=1, 2, ..., W) wavelengths are used for west-to-east and north-to-south traffic and $\underline{\lambda}_i$ for the opposite direction traffic. The ROSS can be suitable for integration in large interconnects by appropriately combining the small switches. The main issues related to building large interconnects include the number of required small switches, uniform attenuation of different optical paths (which is not an issue when ROSS is employed), the number of crossovers, and blocking characteristics.

Four-dimensional (4-D) multiplexing can be employed, as indicated above, to support several million sensors including wavelength-division multiplexing (WDM), time-division multiplexing (TDM), optical division multiplexing (ODM), and OAM multiplexing. The ODM can be based on FBGs whose impulse responses are Slepian sequences. The Slepian sequences $\{s_n^{(j)}(N, W)\}$ of the j-th order (j=0, 1, 2, ...) are mutually orthogonal sequences for sequence length N and discrete bandwidth W, and can be determined as a real-valued solution of the following system of discrete equations:

$$\Sigma E_{i=0}^{N-1}\{\sin [2\pi(n-i)]/[\pi(n-i)]\}s_n^{(j)}(N,W) = \mu_j(N,W)s_n^{(j)}(N,W),$$

where i and n denote the particular samples in each Slepian sequence, while the shaping factors $\mu_j(N, W)$ are ordered eigenvalues. The discrete layer-peeling algorithm (DLPA) has proven to be efficient tool for designing fiber Bragg gratings (FBGs) with a desired transfer function, and this method can be employed to design FBGs having Slepian sequences for impulse responses, called here Slepian-FBGs. However, given the fact that DLPA is performed in spectral domain it faces the finite resolution problem, which results in reduced cardinality Slepian sequences set for a given tolerable cross-correlation coefficient ρ, in particular for non-zero laser pulse-widths. Moreover, given the fabrication limitations, this problem will be even more pronounced during the fabrication process. To overcome this problem, the Bragg gratings are designed to have orthogonal impulse responses by means of the time-domain (TD) based FBG design algorithm. Compared to DLPA, the corresponding TD design algorithm results in FBG designs with impulse responses perfectly matched to the target Slepian sequences, and thus providing the full cardinality of the set of Slepian sequences. Slepian-FBGs can be employed to provide the third multiplexing dimension required, namely, optical-division multiplexing (ODM). To secure the sensor collected data, an all-optical encryption scheme based on Slepian-FBGs can be employed. Alternatively, complex basis functions can be used as impulse responses of corresponding FBGs.

Figure 6:
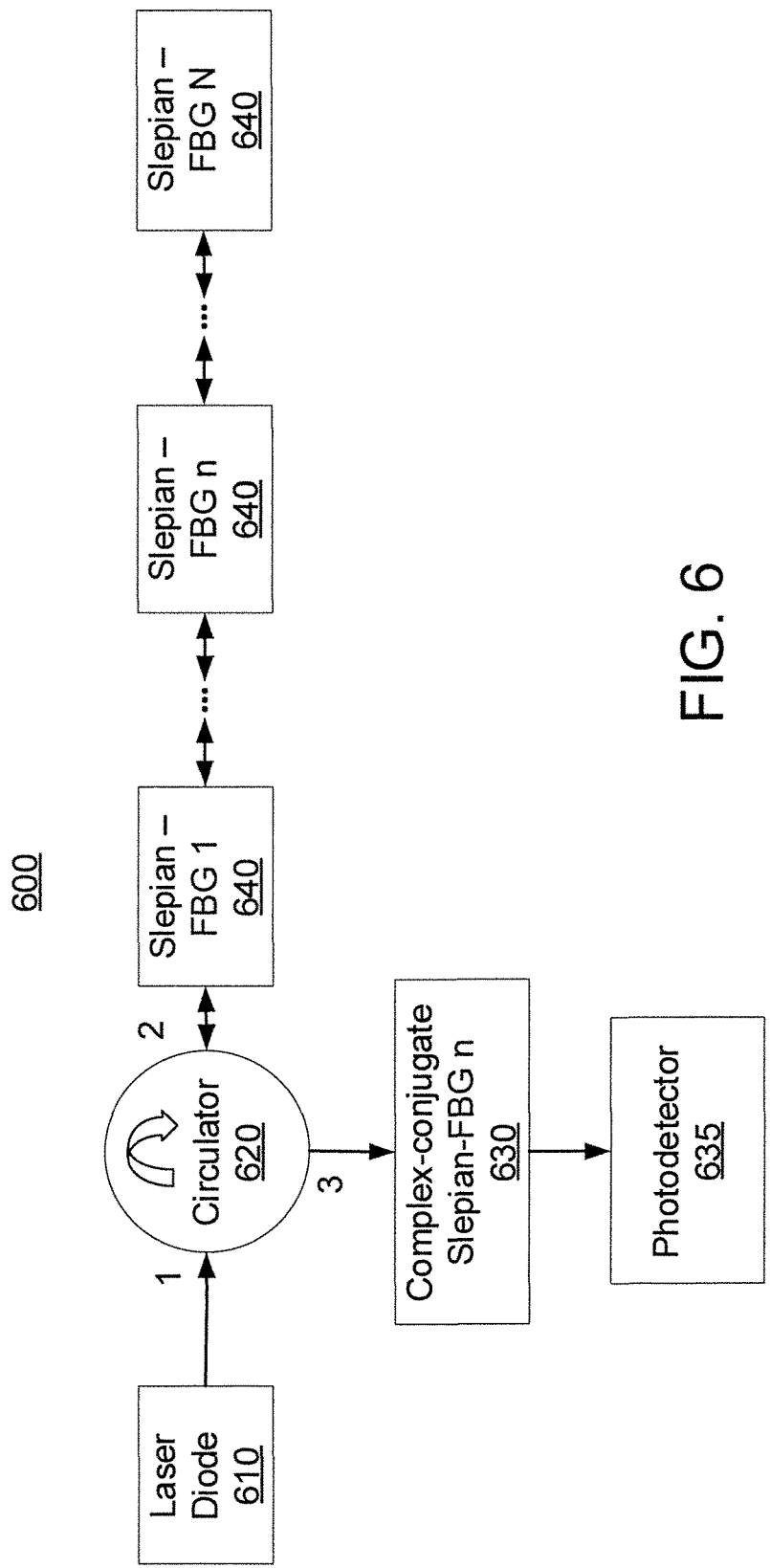
FIG. 6 shows a block diagram illustrating an optical division multiplexing-based passive sensor network employing Slepian-fiber Bragg gratings, in accordance with the present principles.

Referring now to FIG. 6, a block diagram of an optical division multiplexing-based passive sensor network 600 employing Slepian-fiber Bragg gratings is illustratively depicted in accordance with an embodiment of the present principles. In one embodiment, the optical division multiplexing-based passive sensor network employing Slepian-fiber Bragg gratings can include a laser diode 610 that may feed into a circulator 620, with ports 1, 2, and 3 and operation directions 1-2 and 2-3. The circulator 620 can have a bi-directional optical fiber, connected to port 2, with a chain of one or more Slepian-FBGs 640. The chain of Slepian-FBGs can be used in SDOSN architecture shown in FIG. 1. The circulator 620 output 3 passes the reflected signals from FBGs trough fiber and then towards tunable complex-conjugate Slepian-FBG n 630, used to select the signal originated from the n-the Slepian-FBG, caring the optical sensing information originating from the n-th sensor, and forwards it to a photodetector 635. This concept is applicable to both active and passive sensor networks. Since impulse responses of Slepian-FBGs are mutually orthogonal, all FBGs operate on the same wavelength. In this particular configuration, Slepian-FBGs must be fabricated on such a way to be 50% reflective (and 50% transparent).

Another approach to secure the data collected by sensor is to employ the orbital angular momentum (OAM) as a degree of freedom. The pure OAM modes can be generated with the help spatial light modulators (SLMs), and SLMs are defined as $\phi_n = \exp(jn\phi)$; n=0, ±1, ±2, ..., and satisfy the orthogonality principle because the dot-product is $$\langle \phi_m | \phi_n \rangle = \frac{1}{2\pi}\int_0^{2\pi} e^{-jm\phi}e^{jn\phi}d\phi = \begin{cases} 1, n = m \\ 0, n \neq m \end{cases} = \delta_{nm}.$$

Given that OAM-based basis functions are mutually orthogonal they can be used as the basis functions for either OAM multiplexing or multidimensional signaling as well as to improve the physical-layer security. The concern is when employing the OAM degree of freedom for all-optical encryption. The simplest mathematical expression of an OAM mode and zero-order Gaussian beam with an incidence angle θ can be written, respectively, as $u(r,\phi,z) = \exp(-jm\phi)\exp(-jkz)$ and $u_0 = \exp(jk \times \sin \theta)\exp(-jkz)$ where k is the wave number and z is the propagation axis. A computer generated hologram (CGH), which will be recorded on a proper polymer material, represents the interference pattern between two incident beams, in this case a zero-order Gaussian beam and a beam to be generated. The resulting intensity I interference pattern, assuming that z=0 can be expressed as $I = |u(r,\phi,z=0) + u_0|^2 = 2 + 2 \cos(k \times \sin \theta - m\phi)$.

This sinusoidal grating pattern is easy to generate but with low diffraction efficiency. It is well-known that blazed grating can obtain 100% diffraction efficiency, whose interference pattern can be expressed as $I = k \times \sin \theta - m\phi \mod 2\pi$.

Figure 7:
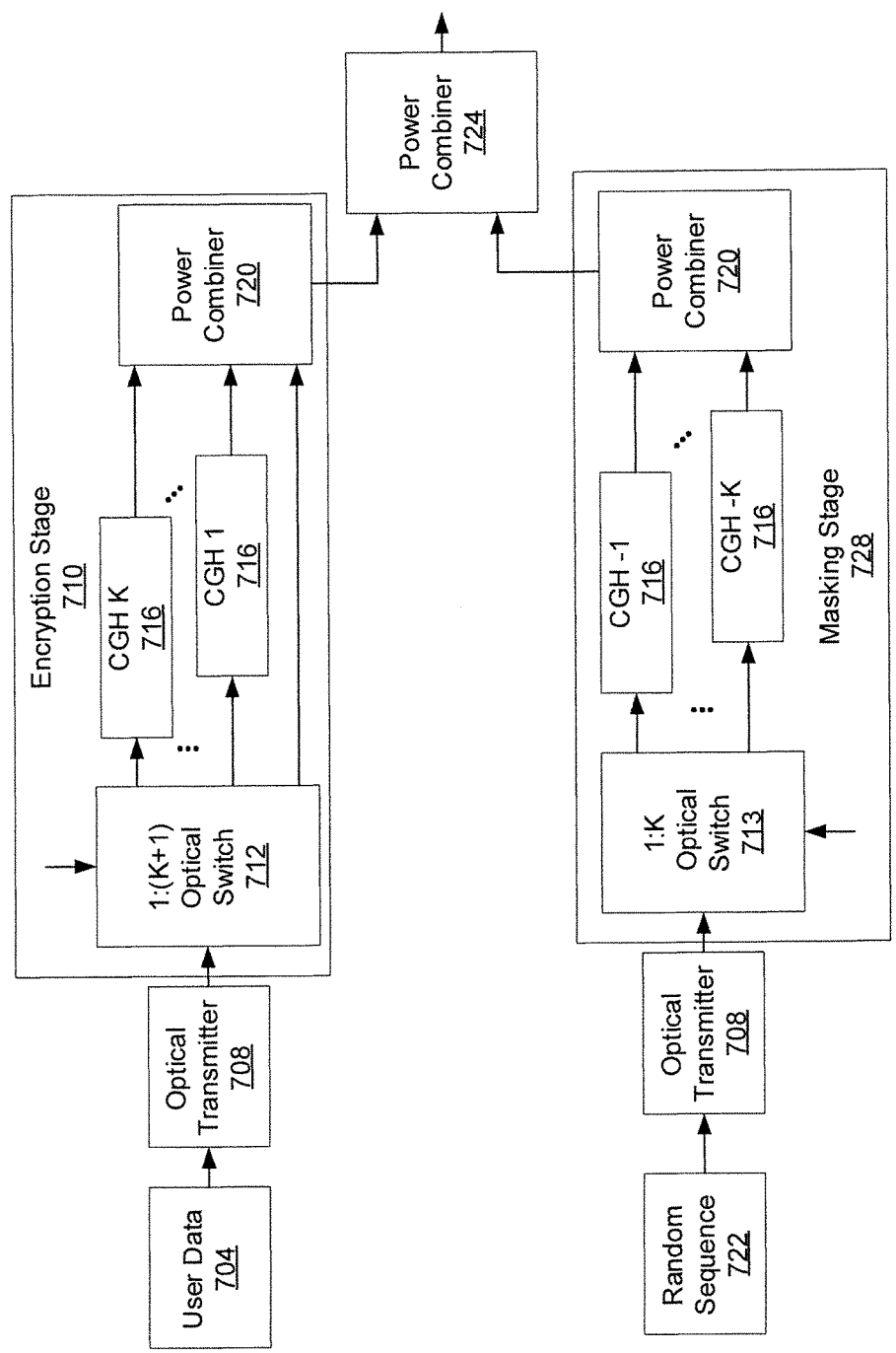
FIG. 7 shows a block diagram illustrating an orbital angular momentum-based all-optical transmitter, in accordance with the present principles.
Figure 8:
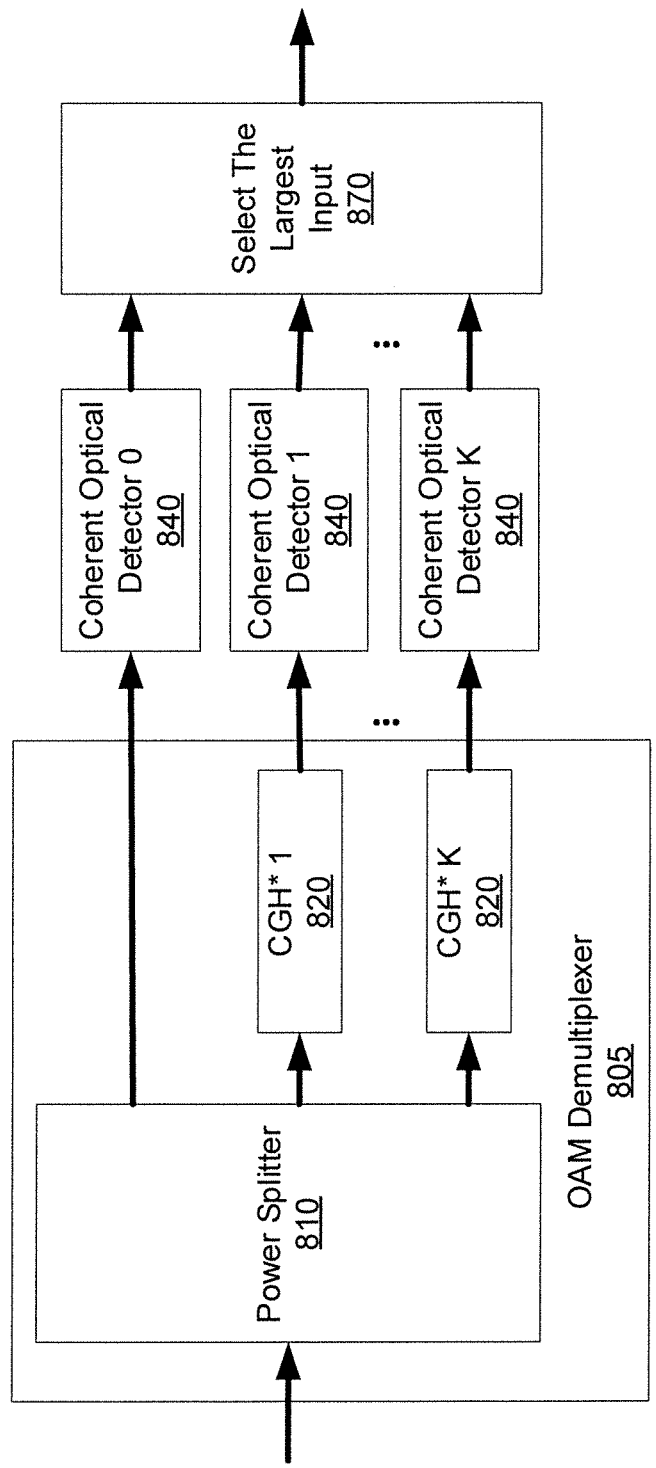
FIG. 8 shows a block diagram illustrating an orbital angular momentum (OAM)-based all-optical receiver for OAM decryption, in accordance with the present principles.

Referring now to FIGS. 7 and 8, a block diagram of an orbital angular momentum-based all-optical transmitter and a block diagram of an orbital angular momentum-based all-optical transmitter are illustratively depicted in accordance with an embodiment of the present principles. FIGS. 7 and 8 describe how OAM modes can be used in both free-space optical (FSO) and multimode fiber (MMF) links, by replacing the single-mode fiber links shown in FIG. 1 with either FSO or MMF links. This scheme employs the following N=2K+1 OAM modes {−K, . . . −1, 0, 1, . . . , K}. The orbital angular momentum-based all-optical transmitter can be composed of encryption stage 710 and masking stage 728. The encryption stage 710 can include an optical switch 712, the optical switch 712 can randomly select the branch imposing non-negative OAM index basis functions. The encryption stage 710 can take user data 704 through an optical transmitter 708 as an input of the optical switch 712. The optical switch 712 can output fibers/waveguides to a power combiner 720. The optical switch 712 can output directly to the power combiner 720, corresponding to zeroth OAM mode, or through one or more CGH elements 716, corresponding to positive indices OAM modes.

The masking stage 728 can include an optical switch 713, the optical switch 713 can randomly select the branch with negative OAM index basis function. The masking stage 728 can take a random sequence or noisy sequence 722 through an optical transmitter 708 as an input of the optical switch 713. The optical switch 713 output goes through one or more CGH elements 716 on the way to the power combiner 720, corresponding to negative indices OAM modes. In the masking stage 728, the samples from complex Gaussian random generator are generated. The purpose of this stage is to add the Gaussian noise so that any data structure is lost in both time- and frequency-domains, providing, therefore, stealth or covert communication capability. Since the additive noise is imposed on orthogonal OAM basis functions, the de-masking stage is not needed on the receiver side. The output from the encryption stage 710 and the masking stage 728 can be combined in a power combiner 724 to produce the output from the transmitter.

The orbital angular momentum-based all-optical receiver for OAM decryption can include an OAM demultiplexer 805. The OAM demultiplexer 805 can include a power splitter 810 that can take an input signal and split the signal to send to one or more coherent optical detectors 840. The one or more coherent optical detectors 840 feed into a select the largest input circuit 870 which outputs the largest input. One or more the signals from the power splitter 810 can pass through a CGH* (*-operation denotes complex conjugation) element 820 before the one or more coherent optical detectors 840. The output of each CGH* element 820 in the OAM demultiplexer 805 represents the projection along the corresponding OAM basis function with nonnegative OAM indices. Since only one OAM mode is used in encryption stage, only the correct complex conjugate OAM basis function will generate strong peak, the other outputs will generate just noisy signals. Therefore, the select the largest input circuit 870 selects the strongest output and can be employed to identify the correct branch. A single local laser is used for all coherent optical detectors. Alternatively, for OAM decryption purposes, OAM demultiplexer can be replaced with reconfigurable complex-conjugate Cal detecting the desired OAM mode n. In this case, only single coherent detector is needed, while select the largest input circuit is not needed. For OAM demultiplexing purposes only (without optical encryption), the select the largest input module 870 is not needed.

Figure 9:
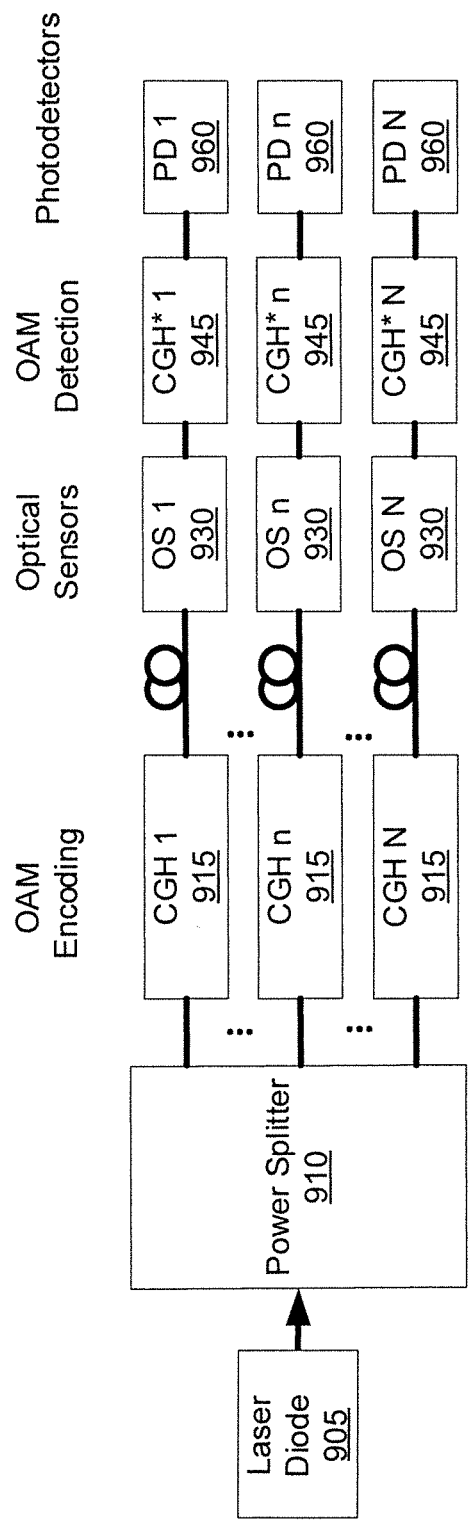
FIG. 9 shows a block diagram illustrating an orbital angular momentum multiplexing for optical sensors, in accordance with the present principles.

Referring now to FIG. 9, a block diagram of an orbital angular momentum multiplexing for optical sensors is illustratively depicted in accordance with an embodiment of the present principles. In addition to all-optical encryption, OAM multiplexing can be used to provide even the fourth dimension for multiplexing, namely, OAM multiplexing, which is illustrated in FIG. 9. This scheme can support up to N optical sensor per single wavelength. The laser diode 905 signal is split into N-branches by a power splitter 910, such as 1:N optical star. In n-th branch OAM mode n is imposed by CGH element 915 n. Each CGH element 915 feed into an optical sensor 930 followed by an OAM detection 945 and a photodetector 960. After sensing is completed, a conversion is performed of OAM modes to Gaussian modes to detect the sensed signals. By employing the time-division multiplexing, each branch can support T time-domain sensors. Further, by employing W wavelength sources, in total NTW sensors can be supported. Given that MMF or FSO links are used, the OAM multiplexing based sensor networks can support the bus topology as well. In that case, each optical sensor node will contain the corresponding CGH device. Finally, by employing L ODM approach, in total NTWL sensors can be supported. For instance, by setting N=T=W=L=50, 6.25 million sensor for reasonable number of discrete levels in each multiplexing dimension can be supported.

An adaptive software-defined optical sensor network (SDOSN) architecture that is capable of hosting programmable sensors ranging from several thousand to several millions is provided. Sensing process is of low cost, but highly accurate and capable of closely approaching the optical channel capacity. The SDOSN architecture is interoperable with existing optical networks infrastructure. The SDOSN can be programmable at runtime to change sensor network topology, active sensors, and their functions to accommodate current sensor network objectives and applications. The sensor network can be cost-effective and leverages the emerging virtual network technologies and software defined network paradigms.

In one embodiment, the nodes in SDOSN can be bidirectional sensor nodes composed of optical transmitter, optical receiver, and sensor device integrated on the same chip. The SDOSN enables sensor networks to be adaptive to time-varying conditions and reconfigurable to specific objectives or applications. The SDOSN building modules/subsystems can include, e.g.: (i) MEMS-based reconfigurable optical space switch, which can be configured to operate as either unidirectional or bidirectional, capable of switching the wavelength band; (ii) hybrid optical sensor physical network organized in optical star topology with individual branches being optical fiber links operating as the optical buses; and (iii) unidirectional/bidirectional sensor nodes. To support high flexibility in terms of number of sensor nodes ranging from several thousand to several millions, four-dimensional multiplexing can be employed that includes time-, wavelength-, optical basis functions-, and OAM basis functions-dimensions. Even with moderate requirements with respect to the number of discrete levels in each dimension, e.g., (>31), several millions of sensor nodes can be supported. The FBGs with orthogonal impulse responses can be employed as the optical basis functions. The class of Slepian sequences, which are mutually orthogonal regardless of the sequence order, can be employed as the target mutually orthogonal FBG-impulse responses. These Slepian sequences based FBGs can be employed not only as an additional degree of freedom for orthogonal-division multiplexing, but also to provide all-optical encryption of high importance in the optically secured, adaptive SDOSN. Additionally, the orbital angular momentum (OAM) can be employed as an additional degree of freedom (DOF) with the purpose to: (i) to secure sensor data and (ii) provide a new DOF, OAM multiplexing, to support a larger number of sensor nodes.

Figure 10:
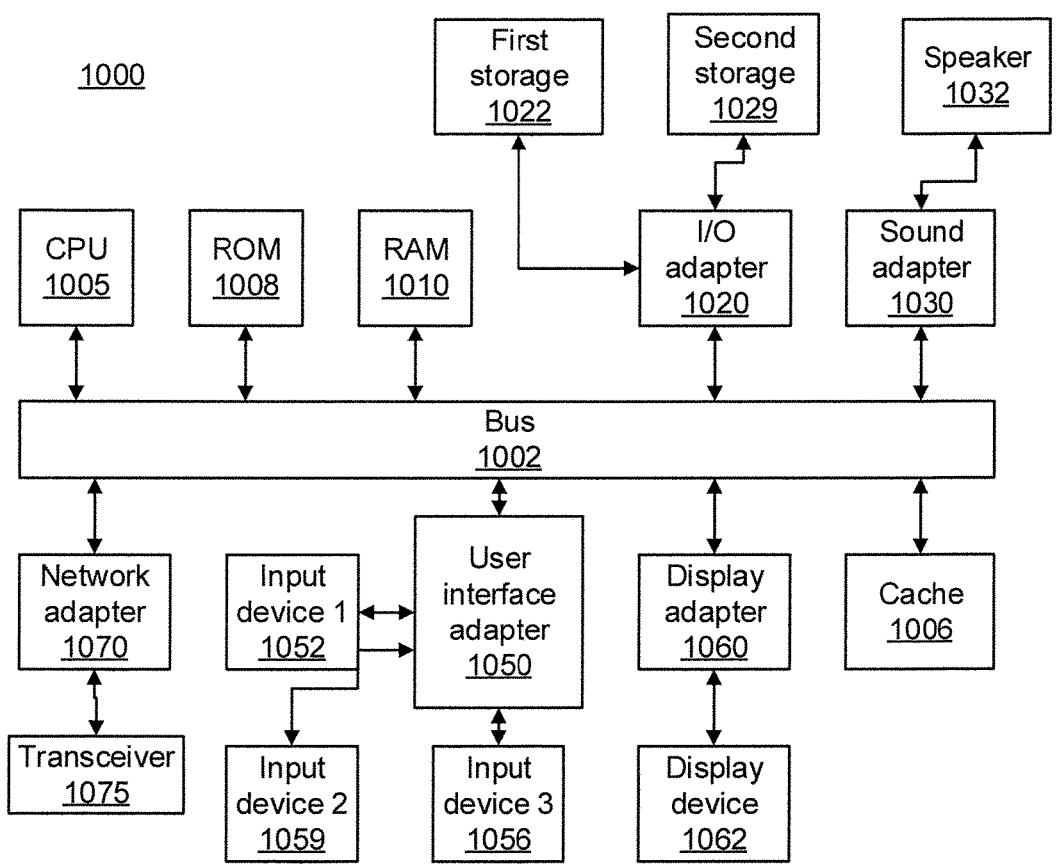
FIG. 10 shows a block diagram of a computer processing system, to be used to reconfigure the ROSS or for control purposes, in accordance with the present principles.

Referring now to FIG. 10, a block diagram of a computer processing system 1000, to be used to reconfigure the ROSS or for control purposes, is illustratively depicted in accordance with an embodiment of the present principles. The computer system 1000 includes at least one processor (CPU) 1005 operatively coupled to other components via a system bus 1002. A cache 1006, a Read Only Memory (ROM) 1008, a Random-Access Memory (RAM) 1010, an input/output (I/O) adapter 1020, a sound adapter 1030, a network adapter 1070, a user interface adapter 1050, and a display adapter 1060, are operatively coupled to the system bus 1002.

A first storage device 1022 and a second storage device 1029 are operatively coupled to system bus 1002 by the I/O adapter 1020. The storage devices 1022 and 1029 can be any of a disk storage device (e.g., a magnetic or optical disk storage device), a solid state magnetic device, and so forth. The storage devices 1022 and 1029 can be the same type of storage device or different types of storage devices.

A speaker 1032 may be operatively coupled to system bus 1002 by the sound adapter 1030. A transceiver 1075 is operatively coupled to system bus 1002 by network adapter 1070. A display device 1062 is operatively coupled to system bus 1002 by display adapter 1060.

A first user input device 1052, a second user input device 1059, and a third user input device 1056 are operatively coupled to system bus 1002 by user interface adapter 1050. The user input devices 1052, 1059, and 1056 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used, while maintaining the spirit of the present invention. The user input devices 1052, 1059, and 1056 can be the same type of user input device or different types of user input devices. The user input devices 1052, 1059, and 1056 are used to input and output information to and from system 1000.

Of course, the computer system 1000 may also include other elements (not shown), as readily contemplated by one of skill in the art, as well as omit certain elements. For example, the devices described in FIGS. 2, 3, 5, 7, and 8 can be controlled by computer system 1000. For example, various other input devices and/or output devices can be included in computer system 1000, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 1000 are readily contemplated by one of ordinary skill in the art given the teachings of the present invention provided herein.

Moreover, it is to be appreciated that network 100 and network 600 described above with respect to FIG. 1 and FIG. 6 are networks for implementing respective embodiments of the present invention. Part or all of computer processing system 1000 may be implemented in one or more of the elements of network 100 and/or one or more of the elements of network 600.

Further, it is to be appreciated that computer processing system 1000 may perform at least part of the method described herein including, for example, at least part of method 1100 of FIG. 11 and/or at least part of method 1200 of FIG. 12 and/or at least part of method 1300 of FIG. 13.

Referring now to FIG. 11, a flow diagram of a method performed in reconfigurable optical sensor network is illustratively depicted in accordance with an embodiment of the present principles. In block 1110, configure, by a controller, the reconfigurable optical sensor network, including one or more reconfigurable optical space switches, for a type of sensor data. In block 1120, generate sensor data in the type of sensor data with one or more of a plurality of bidirectional sensors. In block 1130, send the sensor data to one or more optical star couplers. In block 1140, forward the sensor data from one of the one or more optical star couplers to the one of one or more reconfigurable optical space switches.

Referring now to FIG. 12, a flow diagram of a method 1200 in a reconfigurable optical space switch is illustratively depicted in accordance with an embodiment of the present principles. In block 1210, receive a control signal, from a controller, to configure a path through the reconfigurable optical space switch. In block 1220, apply a voltage to one or more direction changing devices at each intersection between each of the east-west optical waveguides and each of the north-south optical waveguides to form the path through the reconfigurable optical space switch. In block 1230, receive an optical signal in one of a plurality of passive waveguides at a beginning of the path, including the plurality of east-west optical waveguides and the plurality of north-south optical waveguides. In block 1240, output the optical signal out on of the plurality of passive waveguides at an end of the path.

Referring now to FIG. 13, a flow diagram of a four-dimensional multiplexing method 1300 for optical networks is illustratively depicted in accordance with an embodiment of the present principles. In block 1310, receive sensor data to be transmitted on an optical network. In block 1320, encode the sensor data into an optical signal employing one or more multiplexing systems. In block 1330, send the sensor data to one or more optical star couplers. In block 1340, decode the optical signal into the sensor data employing the one or more multiplexing systems. In block 1350, control an operation of a processor-based machine responsive to the sensor data.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A reconfigurable optical space switch, comprising:
a plurality of passive waveguides to transmit optical signals, including a plurality of east (E)-west (W) optical waveguides and a plurality of north (N)-south (S) optical waveguides; and
one or more direction changing devices at each intersection between each of the east-west optical waveguides and each of the north-south optical waveguides configurable to alter a path of an optical signal along one or more of the plurality of passive waveguides, wherein the one or more direction changing devices support full-duplex operation along the passive waveguides.

2. The reconfigurable optical space switch as recited in claim 1, wherein the one or more direction changing devices are microelectromechanical system mirrors.

3. The reconfigurable optical space switch as recited in claim 1, wherein the one or more direction changing devices includes four microelectromechanical system mirrors to enable traffic along E-N, E-S, W-N, and W-S paths.

4. The reconfigurable optical space switch as recited in claim 1, wherein the one or more direction changing devices includes two microelectromechanical system mirrors.

5. The reconfigurable optical space switch as recited in claim 1, wherein the one or more direction changing devices are active vertical coupler units.

6. The reconfigurable optical space switch as recited in claim 5, wherein the active vertical coupler units include two active vertical couplers with a total internal reflection mirror.

7. The reconfigurable optical space switch as recited in claim 6, wherein the active vertical couplers include material with a latcheable index of refraction.

8. The reconfigurable optical space switch as recited in claim 6, wherein the total internal reflection mirror enables 90° redirection between the two active vertical couplers.

9. The reconfigurable optical space switch as recited in claim 1, wherein the one or more direction changing devices includes active vertical coupler units on top of the plurality of passive waveguides and two vertical coupler units on the bottom of the plurality of waveguides.

10. A method for a reconfigurable optical space switch, comprising:
receiving a control signal, from a controller, to configure a path through the reconfigurable optical space switch;
applying a voltage to one or more direction changing devices at each intersection between each of the east-west optical waveguides and each of the north-south optical waveguides to form the path through the reconfigurable optical space switch;
receiving an optical signal in one of a plurality of passive waveguides at a beginning of the path, including the plurality of east-west optical waveguides and the plurality of north-south optical waveguides; and
outputting the optical signal out on one of the plurality of passive waveguides at an end of the path, wherein the one or more direction changing devices support full-duplex operation along the passive waveguides.

11. The method as recited in claim 10, wherein the one or more direction changing devices are microelectromechanical system mirrors.

12. The method as recited in claim 10, wherein the one or more direction changing devices includes four microelectromechanical system mirrors to enable traffic along E-N, E-S, W-N, and W-S paths.

13. The method as recited in claim 10, wherein the one or more direction changing devices includes two microelectromechanical system mirrors.

14. The method as recited in claim 10, wherein the one or more direction changing devices are active vertical coupler units.

15. The method as recited in claim 14, wherein the active vertical coupler units include two active vertical couplers and a total internal reflection mirror.

16. The method as recited in claim 15, wherein the active vertical couplers include material with a latchable index of refraction.

17. The method as recited in claim 15, wherein the total internal reflection mirror enables 90° redirection between the two active vertical couplers.

18. The method as recited in claim 10, wherein the one or more direction changing devices includes active vertical coupler units on top of the plurality of passive waveguides and two vertical coupler units on the bottom of the plurality of waveguides.

19. A reconfigurable optical space switch, comprising:
a plurality of passive waveguides to transmit optical signals, including a plurality of east (E)-west (W) optical waveguides and a plurality of north (N)-south (S) optical waveguides; and
one or more direction changing devices at each intersection between each of the east-west optical waveguides and each of the north-south optical waveguides configurable to alter a path of an optical signal along one or more of the plurality of passive waveguides, wherein the one or more direction changing devices includes active vertical coupler units on top of the plurality of passive waveguides and two vertical coupler units on the bottom of the plurality of waveguides.

* * * * *